United States Patent [19]
Burgbacher

[11] Patent Number: 5,170,083
[45] Date of Patent: * Dec. 8, 1992

[54] PERMANENT MAGNET EXCITED ELECTRIC MOTOR

[75] Inventor: Martin Burgbacher, St. Georgen, Fed. Rep. of Germany

[73] Assignee: Papst-Motoren GmbH & Co. KG, St. Georgen, Fed. Rep. of Germany

[ * ] Notice: The portion of the term of this patent subsequent to Mar. 5, 2008 has been disclaimed.

[21] Appl. No.: 665,525

[22] Filed: Mar. 5, 1991

Related U.S. Application Data

[63] Continuation of Ser. No. 218,397, Jul. 13, 1988, Pat. No. 4,998,032, which is a continuation-in-part of Ser. No. 140,976, Jan. 6, 1988, abandoned, which is a continuation of Ser. No. 2,957, Jan. 13, 1987, abandoned.

[30] Foreign Application Priority Data

Jan. 13, 1986 [DE] Fed. Rep. of Germany ....... 3600737
Jul. 13, 1987 [DE] Fed. Rep. of Germany ....... 3723099

[51] Int. Cl.[5] ............................................. H02K 5/24
[52] U.S. Cl. ..................................... 310/51; 310/193; 310/254; 310/156
[58] Field of Search ...................... 310/51, 154, , 156, 310/179, 186, 187, 188, 190, 192, 193, 216, 218, 254, 261, 264, 265, 269, 49 R

[56] References Cited

FOREIGN PATENT DOCUMENTS 0169569 11/1990 European Pat. Off. .

Primary Examiner—Mark O. Budd
Attorney, Agent, or Firm—Fitch, Even, Tabin & Flannery

[57] ABSTRACT

A permanent magnet excited motor is provided with a plurality of low circumferential hump-like protrusions on the face of each stator pole to partially decrease the air gap between the stator and rotor and act as so-called magnetic cams to exert a force on the rotor to smooth an otherwise uneven parasitic slot torque that occurs between the interaction of slot openings of the stator poles and the gaps between the permanent magnet poles of the rotor.

7 Claims, 8 Drawing Sheets

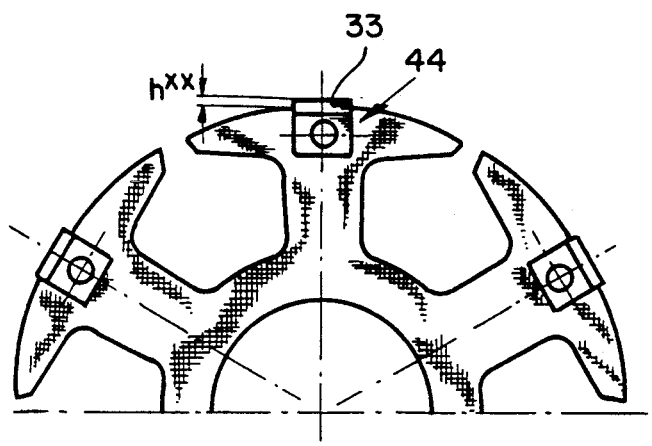
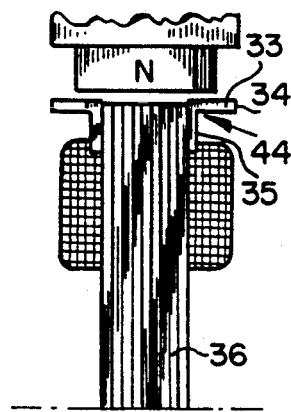
FIG. 2a  FIG. 2b
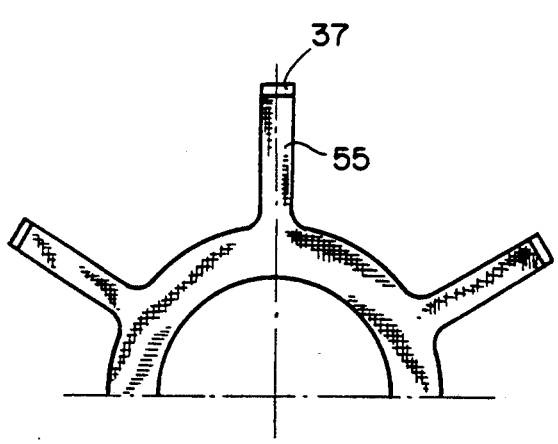
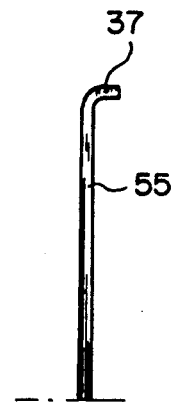
FIG. 3a  FIG. 3b

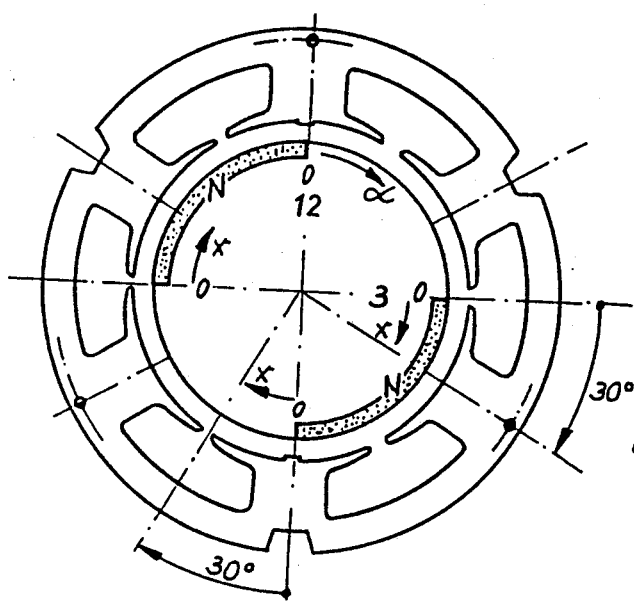
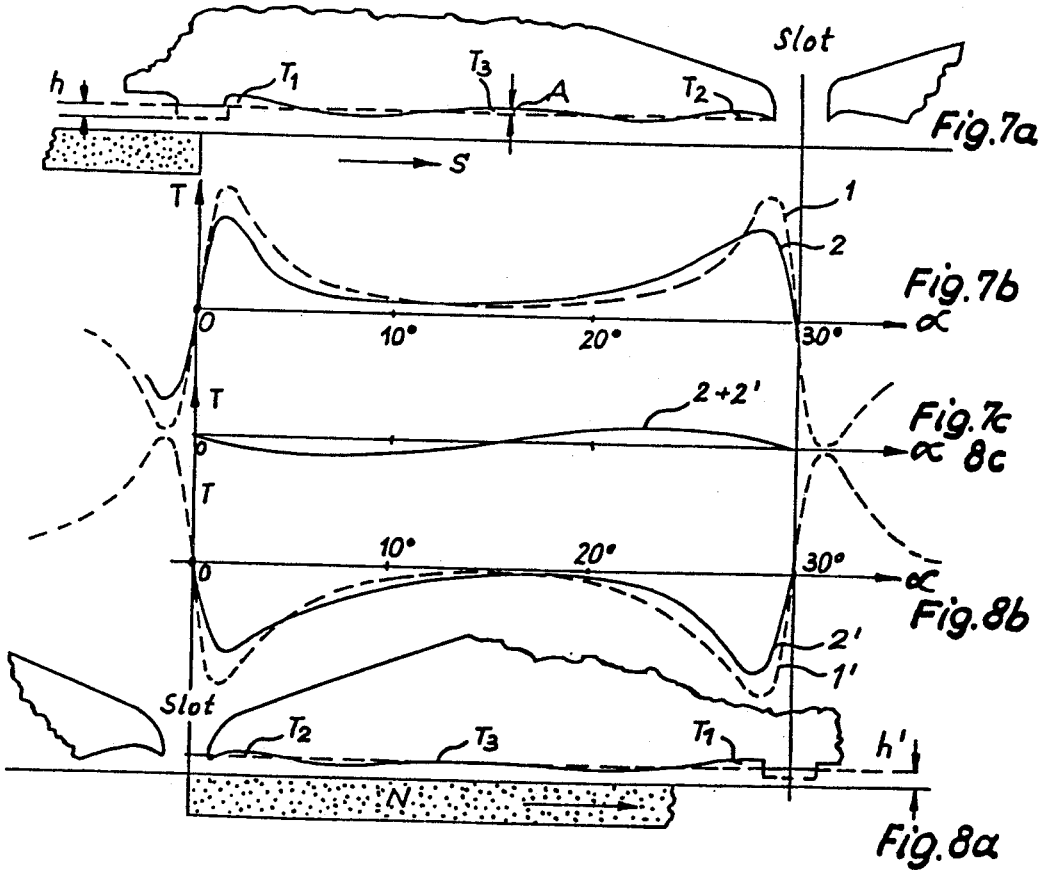

PERMANENT MAGNET EXCITED ELECTRIC MOTOR

This application is a continuation of Ser. No. 07/218,397, filed Jul. 13, 1988, now U.S. Pat. No. 4,998,032 which is a continuation-in-part of U.S. Ser. No. 07/140,976, filed Jan. 6, 1988, now abandoned, which is a continuation of U.S. Ser. No. 07/002,957, filed Jan. 13, 1987, now abandoned.

This invention concerns a permanent magnet excited dynamo machine with a slotted core, especially a small brushless dc motor with permanent magnetic rotor poles of a relatively high induction.

In motors of this type, so-called permanent magnet excited machines (PMEM), interfering or parasitic torques develop because of the interaction between the slots and the edges of the magnetized poles and prevent smooth running of the machine. If the gap between the magnetized poles is smaller, the interfering or parasitic uneven torque component (so-called slot torque unevenness) tends to be greater.

If motors of this type are to be used in signal processing units with specifications for an extremely compact design, one is forced to use especially strong permanent magnets for the rotor, so-called "rare earth magnets," e.g., those of a samarium cobalt alloy. When such a motor is used for disk memory where the storage plate is only 3.5 or 5 ¼ inches and must also be located inside the disk hub (with an outside diameter of 40 mm or even as little as 25 mm), i.e., when a relatively high power must be obtained from such a small structural volume, a polyphase winding is used in addition to a rare earth magnet for high air gap induction although this is not easy to manufacture because of the extremely small size. The essentially cylindrical air gap is then generally located radially outside the cylindrical outer surface of the stator so it is around the stator and the radial gap is relatively small even in the case of an external rotor motor.

In this application, a primary purpose is to improve the practical examples according to FIGS. 4 to 6. Among other things, a version with a larger number of rotor poles is to be considered here.

Permanent magnetic rotors for such motors are often built from thin half-shells or quarter-shells or radially thin axially stacked rings. The radial thinness of these rotor magnets comes from the very limited diameter of the motor. For extremely small, high power motors, the air gap must also be minimized (air gap: average distance with an electromotor effect between the iron surface of the stator and the iron surface of the rotor). Thus with the combination of high induction, slotted stator and the smallest possible air gap, this leads the problem of reducing or preventing if possible the so-called slot torque unevenness which causes problems in a motor with the most constant possible torque. At the same time because of the danger of grazing or because of the manufacturing expense, a "minimum mechanical size" is needed for the air gap.

If the permanent magnetic rotor is also to be magnetized trapezoidally, this offers power advantages but at the same time the problem becomes even more severe in comparison with the conditions with sinusoidal magnetization.

It is known from German document DE-OS No. 2,823,208 that a certain periodicity can be provided in the stator surface at the air gap in order to reduce the third harmonic in the torque so the air gap is varied in a periodic manner over the periphery.

This invention is based on the problem of achieving even smoother operation of motors of the type defined initially despite the high field concentration in the air gap. In addition, especially the average air gap (see above definition) should also be reduced. Motors with a larger number of poles should also be optimized.

The short peripheral elevations (hump-like protusions) according to this invention narrow the air gap partially above the stator pole and act like "magnetic cogs," exerting forces on the rotor that are utilized to even out the torque. The cross section of these cogs is approximately rectangular and is in (or at) the middle of each stator pole in an important version of this invention.

This invention will now be explained in a preferred version with the motors mentioned initially having a cylindrical air gap and slotted stator with a multiphase winding without any overlap.

The figures show the following:

FIG. 1d is an enlargement of a portion of FIG. 1a.

FIGS. 2a, 2b show an alternative element or an element to be used in addition with an effect similar to that of the first practical example according to FIG. 1a.

FIGS. 3a and 3b show an easy to manufacture alternative solution to FIGS. 2a and 2b, where FIGS. 2a and 3a each show the end view in axial direction and FIGS. 2b and 3b each show a section through the diagrams according to FIGS. 2a and 3a.

Figure 1A:
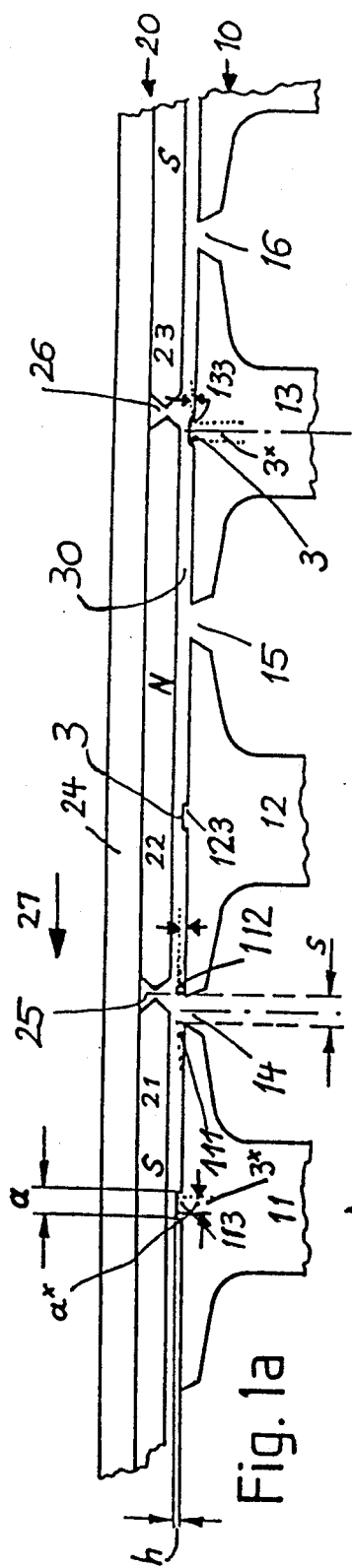
FIG. 1a shows a developed longitudinal section of a motor according to this invention in a first version whereby the ratio of the number of stator poles to the number of rotor poles is 3 to 2.
Figure 4:
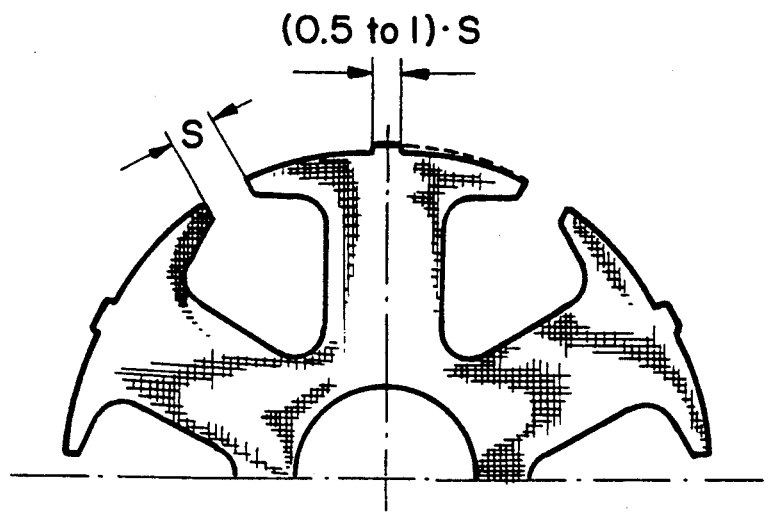

FIG. 4 essentially shows the first variation according to FIG. 1a approximately four times natural size where the air gap is tapered toward the stator pole end where it matches the cylindrical surface which also surrounds the elevations according to this invention.

Figure 5:
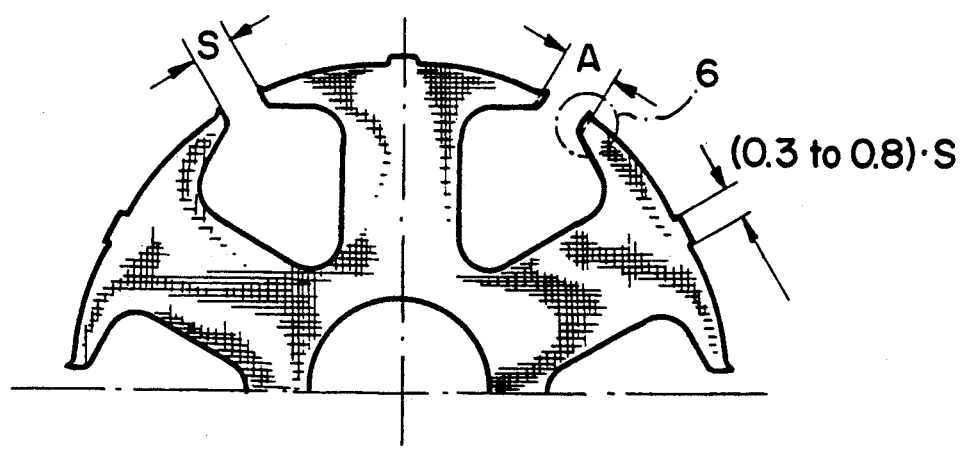

FIG. 5 shows a second version, where ends tapering radially in a point toward the pole end are provided.

Figure 6A:
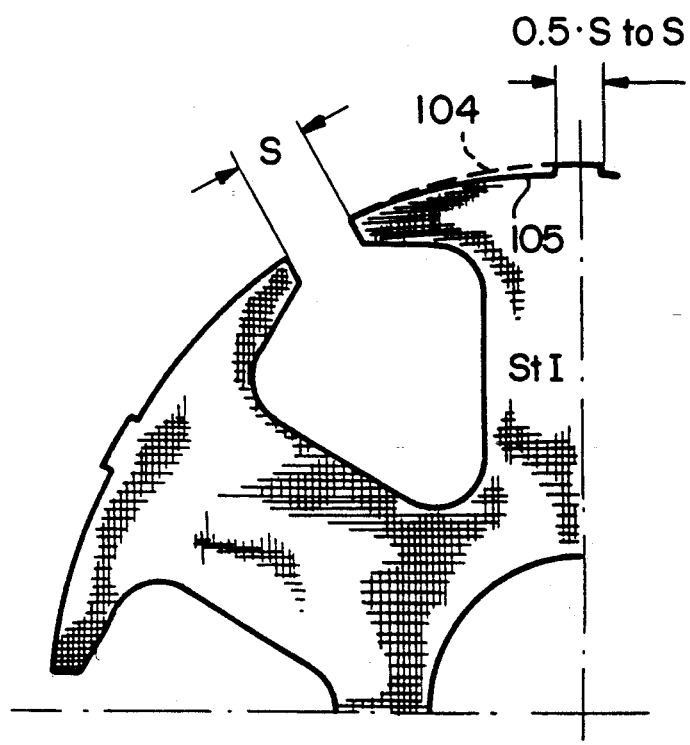
Figure 6B:
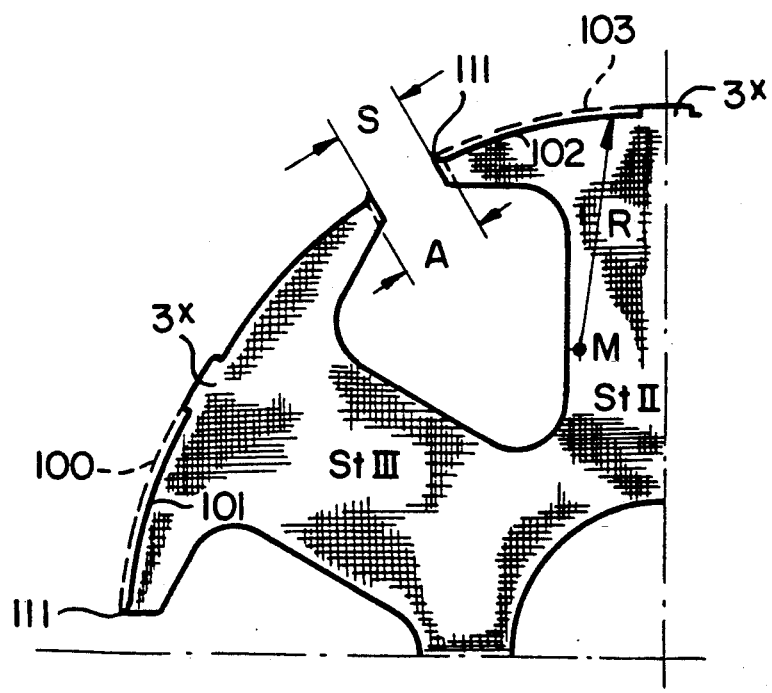

FIGS. 6a and 6b show the stator contours of FIG. 4 and 5 in an enlarged diagram.

FIGS. 7 and 8 illustrate how another version operates. FIGS. 9a, 9b, 9c, and 9d relate generally to an internal rotor motor of the invention showing a plurality of raised portions on each of the stator poles.

In detail, FIG. 1a shows the partial developed view of a 6-pole stator with concentrated poles 11, 12, 13 and a 4-pole rotor with the permanent magnet poles 21, 22, 23 between which the peripherally narrow pole gaps 25 and 26 are arranged, while the stator slot orifices 14, 15 with their width 's' indicate the distance between two stator pole ends. Looking concentrically toward the middle of each stator pole one can see the magnetic cogs 3 (numbers 113, 123, 133) with their peripheral dimension 'a' and height 'h'. Between the stator 10 and the rotor 20, there is the air gap 30 bordered by the stator pole heads and the permanent magnets of the rotor 21, 22, 23. A soft magnetic short-circuit layer 24 surrounds the four rotor poles 21ff. With rotation, i.e., movement of rotor 20 in the direction of arrow 27, the problem causing wherein parasitic torque effect, i.e., the unevenness torque component according to curve 1 in FIG. 1b, occurs due to the interaction of the stator slot orifice 14 and the rotor pole gap 25. At the same time, an uneven torque component in phase opposition according to curve 2 also occurs at the distance of the rotor pole pitch $\tau_p$ rotor due to the interaction of the magnetic cog 133 with the rotor pole gap 26, and namely this occurs in the area of the rotor pole gap 26. FIG. 1c shows the superposition of curves 1 and 2. The instantaneous curve of the damaging uneven parasitic slot torque effect occurs when the permanent magnet of a high induction, e.g., 21, travels with its end (in the area of pole gap 25) away from stator pole 11 over the open slot 14 to the next stator pole 12.

Figure 1B:
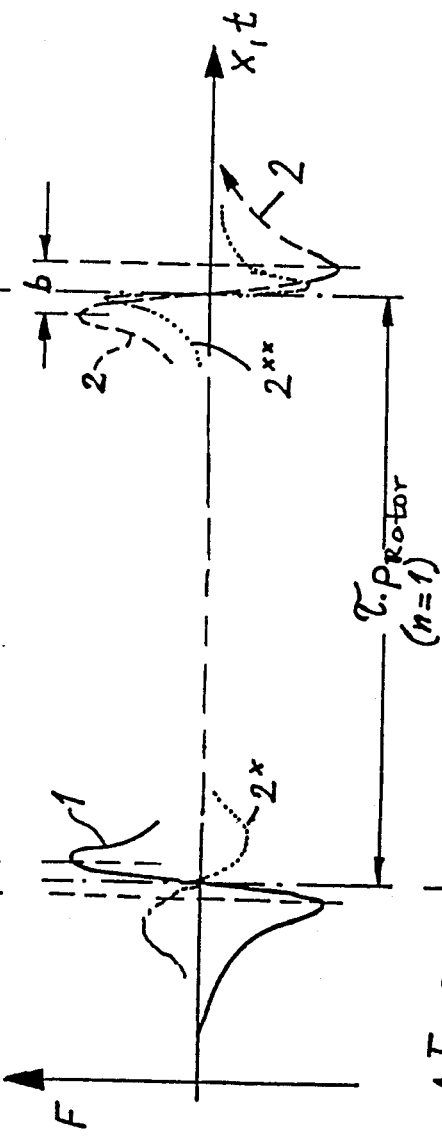
FIG. 1b shows a diagram of problem causing slot torque unevenness 1 and the course of the useful torque component 2 according to this invention.
Figure 1C:
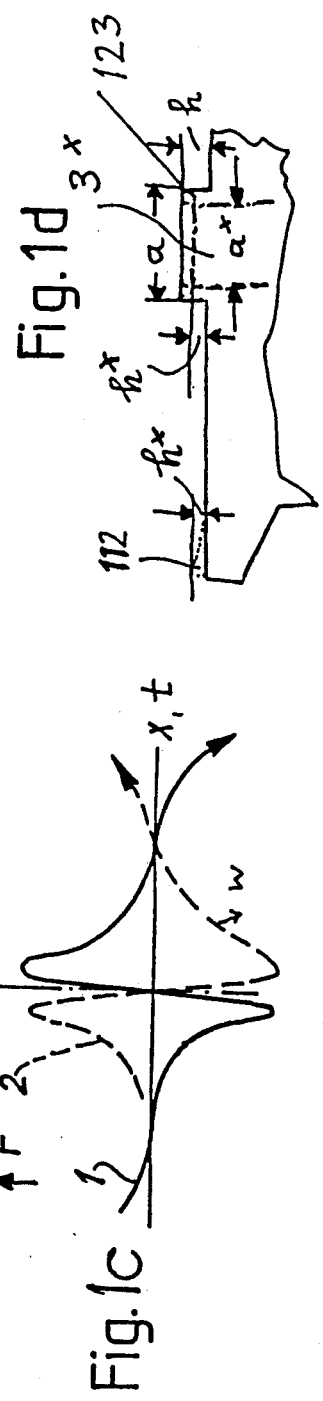
FIG. 1c shows combined curves 1 and 2.
Figure 1D:
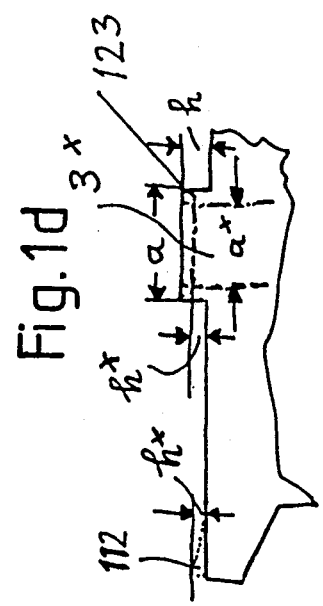

This has been confirmed by measurements which have shown that when the edge of slot 14, for example, is between the poles, e.g., between 21 and 22, the maximum unevenness occurs as shown by the shape of curve 1 in FIG. 1b. Therefore, the distance between the peaks in curve 1 corresponds to the width 's' of the slot orifices, e.g., 14.

In order to adapt the distance 'b' of the peaks of the compensation moment (curve 2) of cogs 3 according to this invention to this distance 's', it is important to optimize the cog width 'a' in this sense, because the problem-causing torque (curve 1) is fully compensated by curve 2 for b=s. This optimum cog width is in the range of 'a'=0.5 to 1×s but is influenced by the inductance pattern of the permanent magnet.

It has thus been found that uneven torque components which have almost the same diagram as those of the slot openings or orifices (see curve 1) with appropriate dimensioning and positioning of the "magnetic cogs" (3) can likewise be produced. If these "cogs" are arranged in such a way that their average distance from the respective slot opening is equal to one pole pitch of the rotor (p) or an integral multiple thereof, then the uneven torque component of the "cogs" is in inverse ratio to that of the slots, i.e., the unevenness is compensated (see curve 2).

The peripheral width 'a' of this cog, i.e., its dimension in peripheral direction, may amount to only a small fraction of the stator pole pitch. There is an optimum between this peripheral width 'a' of the cog and the slot width s between these stator poles (or stator heads) so even a very small cog width 'a' also permits a simultaneous enlargement of the slot because the conditions are otherwise the same (which facilitates manufacturing of the windings).

Especially with a 6-slotted motor for a 3-phase winding with four rotor poles as disclosed in German document DE-OS No. 3,122,049, it is found that this invention yields an excellent reduction in this unwanted slot torque unevenness.

Optimization experiments have shown that narrowing the air gap toward the ends of the stator heads through locations that project radially, e.g., points on the stator pole end as known from German document DE-OS 2,919,581 or 3,049,494 with so-called reluctance motors yields another improvement for the present problem.

Providing the stator heads with pointed ends 6 according to FIG. 5 have an effect similar to that of cogs. But since their distance A is always larger than the slot orifice width 's' their curve $2^x$ has a smaller amplitude and their position is also shifted away from the middle of the slot. This results in a relatively large harmonic which is why these points are optimally combined with an even narrower cog ($a^x=0.3 \cdot S$ to $0.8 \cdot S$). It has surprisingly been found that the same ratios are achieved with a reduced cog height $h^x=0.05$ to 0.2 mm at the same time and thus a further favorable reduction in the average air gap width is possible.

In FIGS. 1a and 1b, this is illustrated by representing t second solution with a dash-dot/dotted line. The compensation effect of the attached tips 111, 112 corresponds to curve $2^x$, and the compensation effect of the cam $3^x$ which is shorter in the periphery corresponds to curve $2^{xx}$ (see FIG. 1b). Both effects take place simultaneously with the overall effect as illustrated in curve 2 but this result occurs at a smaller $h^x$, so the average air gap is smaller and the motor is stronger. This surprising refinement is all the more welcome since a certain oversize must be added for manufacturing tolerances in addition to the minimum theoretical air gap in designing motors and with regard to the air gap in motors of this small size, each 1/10 mm is important.

The cog height 'h' determines the height (amplitude) of the maximum. This can be implemented as part of the usual air gap widths (0.3 mm to 0.6 mm) as h=0.1 mm to 0.3 mm high accordingly (case shown in FIG. 4). In order to minimize the average increase in air gap caused by the presence of cogs, it is also proposed that the diameter from the slot opening be increased continuously to that of the cog diameter in accordance with FIG. 4.

As an alternative or in addition, a "cog-like" effect can already be achieved in the slotted area by means of magnetic closing thereof by means of ferromagnetic slot parts as known from German document DE-AS No. 1,194,043.

Essentially it seems possible to apply this invention to slotted rotor packages as well. When these rotate in the field of permanent magnets (then on the stator side), smooth running can also be improved there. However, this version means that a mechanical collector is required. In special applications, motors used, may also need an improvement in running properties by reducing the slot torque unevenness.

FIG. 2a shows ferromagnetic angles 33 riveted onto the stator core with their axial legs 34 projecting beyond the core 36 so the air gap between them and the outer rotor magnet N is reduced. Therefore, these axially directed legs 34 act like magnetic cogs according to this invention in the middle of the pole. This solution is definitely a compromise because on the whole this means that the effective air gap between the rotor and stator (N, 36) is relatively large. However, no special punching tool need be provided to produce the core 36. The angles are attached axially on both sides to the ends of the stator core as illustrated in FIG. 2b. However, the rotor magnet which projects axially together with the angles 33 projecting axially beyond the stator core, especially axial leg 34, yield an effective and inexpensive application of this invention or may even effectively improve an arrangement according to FIG. 1.

FIGS. 3a and 3b show how the angle 34 can be replaced by end plates with angled axially projecting tabs 37.

FIGS. 5 and 6b show a reduction in air gap toward the stator pole ends (as indicated with a dash-dot line in FIG. 1a), so the peaks of the respective torque effects (curves $2^x$) are further apart (corresponding to the distance A) than the slot orifice width 's'. This effect was explained in connection with FIG. 1. A circular cylindrical elevation 102, 105 toward the cylindrical sheathing surface 103 starting from the recess next to cog $3^x$ and extending to the recess next to the tip 111 at the stator pole end is provided in the area around the middle between the respective stator pole middle and any stator pole end so the average air gap diameter is effectively reduced (see FIG. 6b stator pole ST II). The radius of curvature R of this elevation 102, 105 is much smaller than that of the enveloping surface 103, 100, 104 (FIGS. 6a, 6b). The midpoint M of the curvature 102, 105 is located between the rotor axis and the stator pole head.

FIG. 5 shows primarily cylindrical concentric stator pole faces whose midpoint of curvature is in the rotor axis (as shown more clearly by areas 100, 101 in stator version ST III in FIG. 6b).

The relationships illustrated in FIG. 6b will be further optimized according to this invention.

In FIGS. 7 and 8, operation according to this invention is illustrated further by comparing the conditions here on a 6-pole external stator and a 4-pole internal rotor, namely the uneven slot torque components and their reduction, their superposition as they actually occur in the example shown here, e.g., at the 12:00 o'clock position or at the 3 o'clock position. At the 12:00 o'clock position, one north pole reaches the area of the stator pole middle and at the 3:00 o'clock position one north pole, for example, leaves the slot middle area. These two pulsating components are mutually superimposed in a decelerating and driving manner so they cancel each other out. The conditions in the area of the stator pole middle at the 12:00 o'clock position are illustrated in FIG. 7 and the conditions in the slot area at the 3:00 o'clock position are shown in FIG. 8. Subfigures 7a, 8a show the stator contour with the air gap enlargement areas $T_1$, $T_2$ and $T_3$ as defined in the description and in the claims. Curves 1a–1d show the slot pressure moments which occur when only one cog is provided in the stator pole middle and the stator pole head area is also cylindrical. If indentation $T_1$ is placed next to the cog and indentation $T_2$ is placed in front of the stator pole end as described above the pulsating component is reduced so the height of the cog can be greatly reduced so its outer face toward the air gap is at approximately the same level as the tip of the stator pole at its end. In this way, a drastic air gap reduction is already achieved as described above. These two components are illustrated by curve 2. The curves 2 and 2' then do not yield a zero line as the sum of 1 and 1' but instead this sum curve for 2 and 2' has a certain waviness which is a relative disadvantage, but this effect can be further reduced or eliminated by providing a relative air gap enlargement $T_3$ between the stator pole middle and the stator pole end which is about 1/10 the stator pole width in the circumferential direction and on the whole is much smaller than the air gap enlargement next to the cog and at the pole arc end. Because this enlargement $T_3$, the waviness in the sum group 2 and 2' can be further reduced, and again we have a sum moment of zero. This means that the average air gap reduction can be accomplished without the disadvantages of such a pulsating extra component.

Figure 9A:
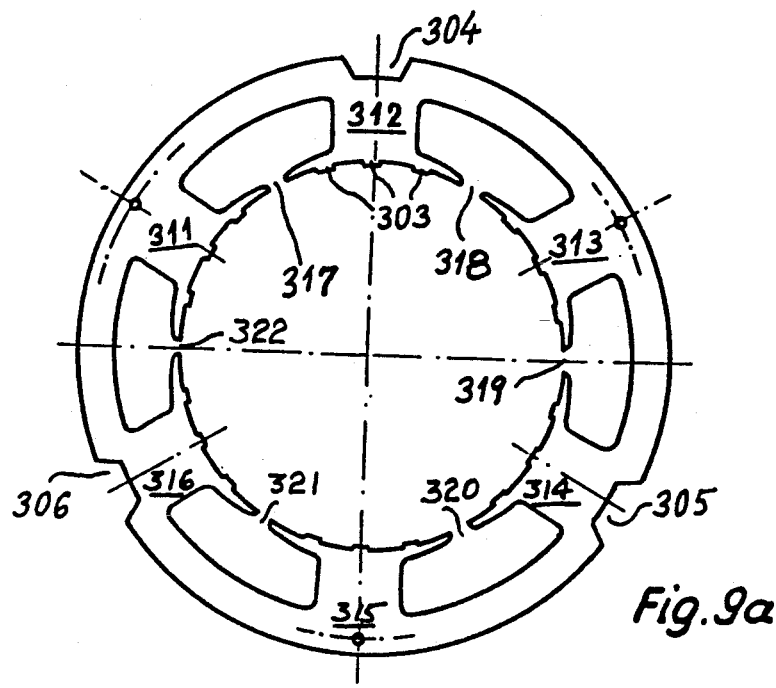
Figure 9B:
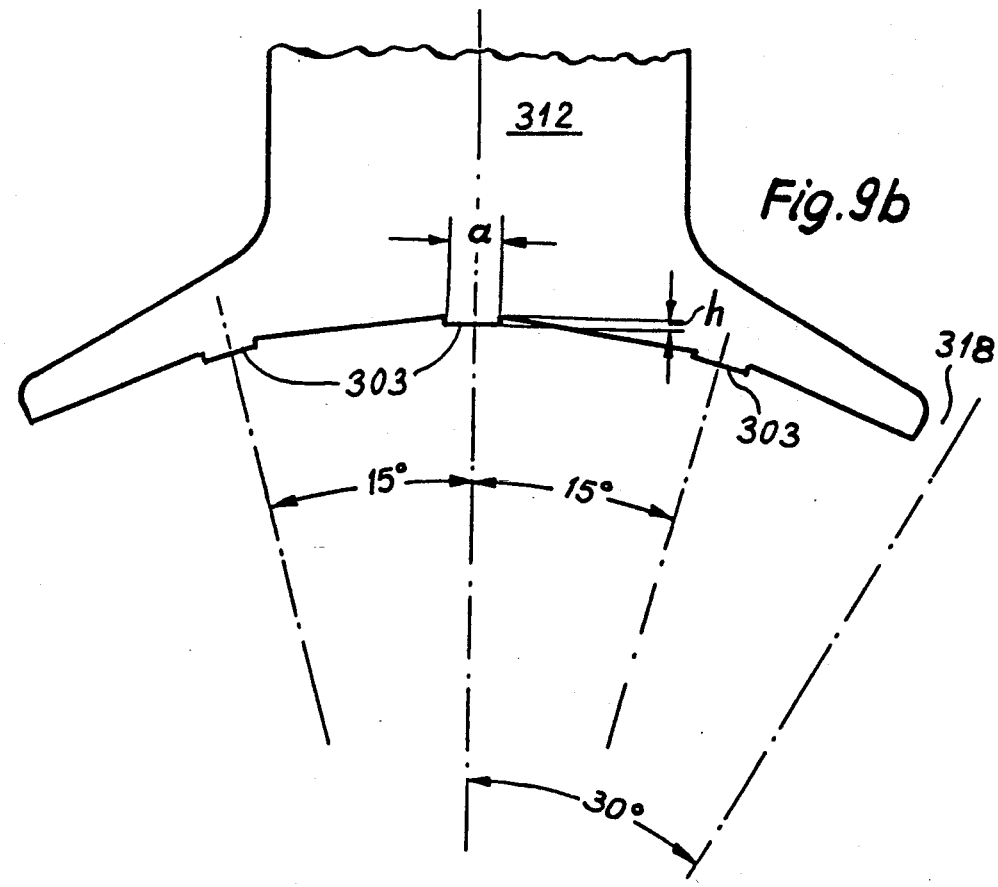
Figure 9C:
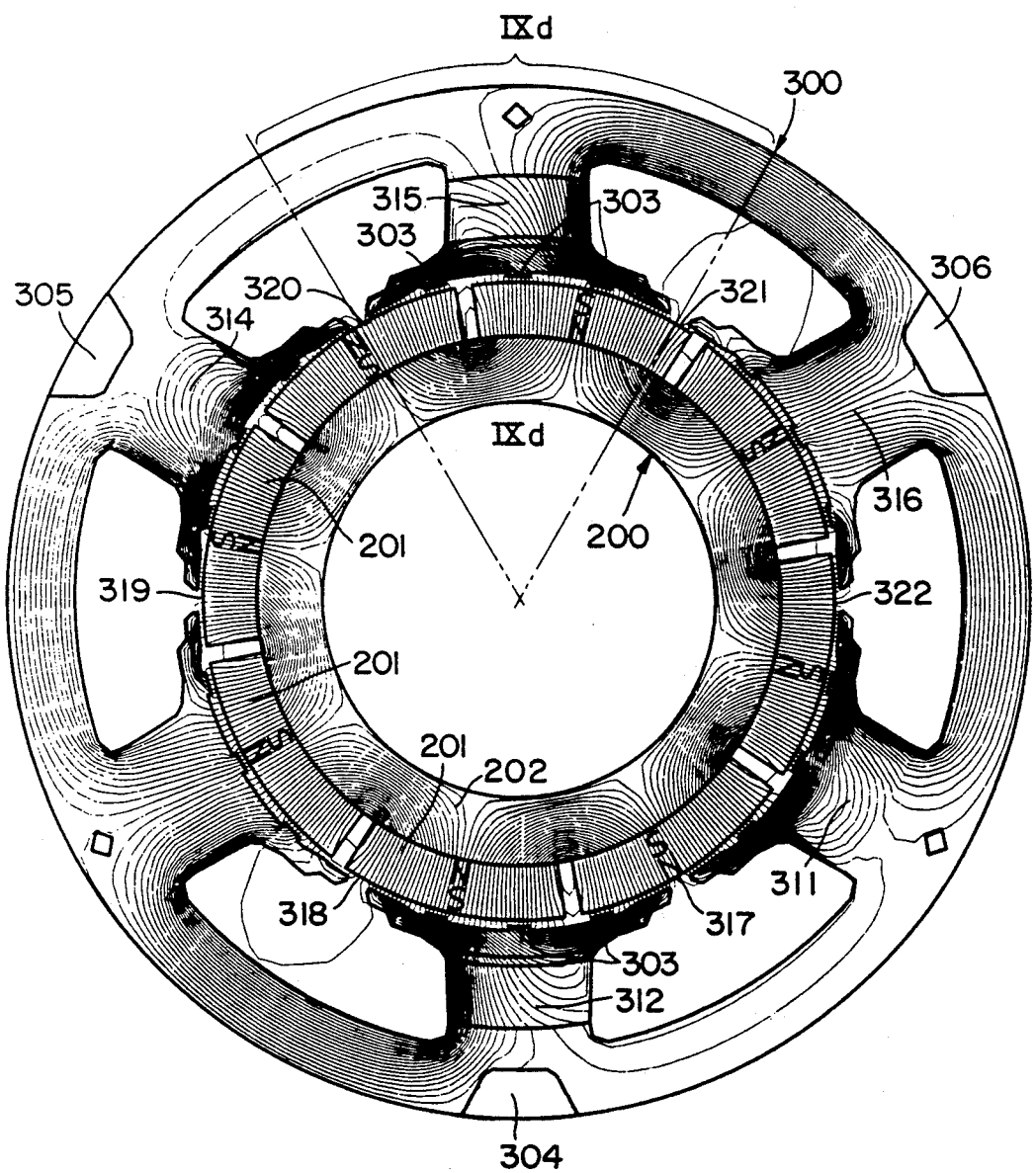

FIG. 9a shows a complete stator section with six outer stator poles for an 8-pole inner rotor as shown in FIG. 9c. According to this invention, three cogs 303 are provided on each stator pole 311–316 in such a way that one sits centrally in the middle of the stator pole and another cog sits between the middle of the stator pole and the middle of one slot 317–322 so there is an equidistant distribution of three cogs 303 between two stator slots (adjacent). Between two adjacent cogs 303 or between one cog 303 and the adjacent stator pole end, the finer refinements as described above in combination with FIGS. 4 to 7 can also be used in addition.

FIG. 9b shows the dimensional relationships of a single stator pole in an enlarged detail. The cog height 'h' here may be 0.2 mm. The cog width 'a' in the peripheral direction may be 1.8 mm. The mechanical distance between two cogs and between one cog and the adjacent slot is 15 mechanical degrees. The air gap diameter may be about 50 mm.

FIGS. 7a and 8a also show the additional recess in the middle between the cog in the center of the stator pole and the adjacent slot as about 1.1 mm with an air gap diameter of about 50 mm.

FIG. 9, i.e., FIGS. 9a to 9d, show a practical example with an 8-pole rotor of the motor with 6 slots in the stator.

With a larger number of poles, each slot can be compensated by several cogs, e.g., three shown in FIG. 9. In this way the cog height can be reduced to 1/3 the height that would otherwise be required in the embodiments of FIGS. 1 to 8.

This invention can fundamentally also be used with other air gap forms, e.g., with a planar air gap, but this form of implementation requires additional measures because the stator pole width must be varied in the longitudinal direction of the slot, for example.

FIG. 9c shows an enlarged and more complete computer printout of the parts of the magnetic circuit for the practical example according to FIG. 9a where the laminated stator 300, the internal rotor 200 with its 8 permanent magnet poles 201 can be seen mounted on the magnetic flux return path 202 which is preferably designed as a soft iron hollow cylinder.

Figure 9D:
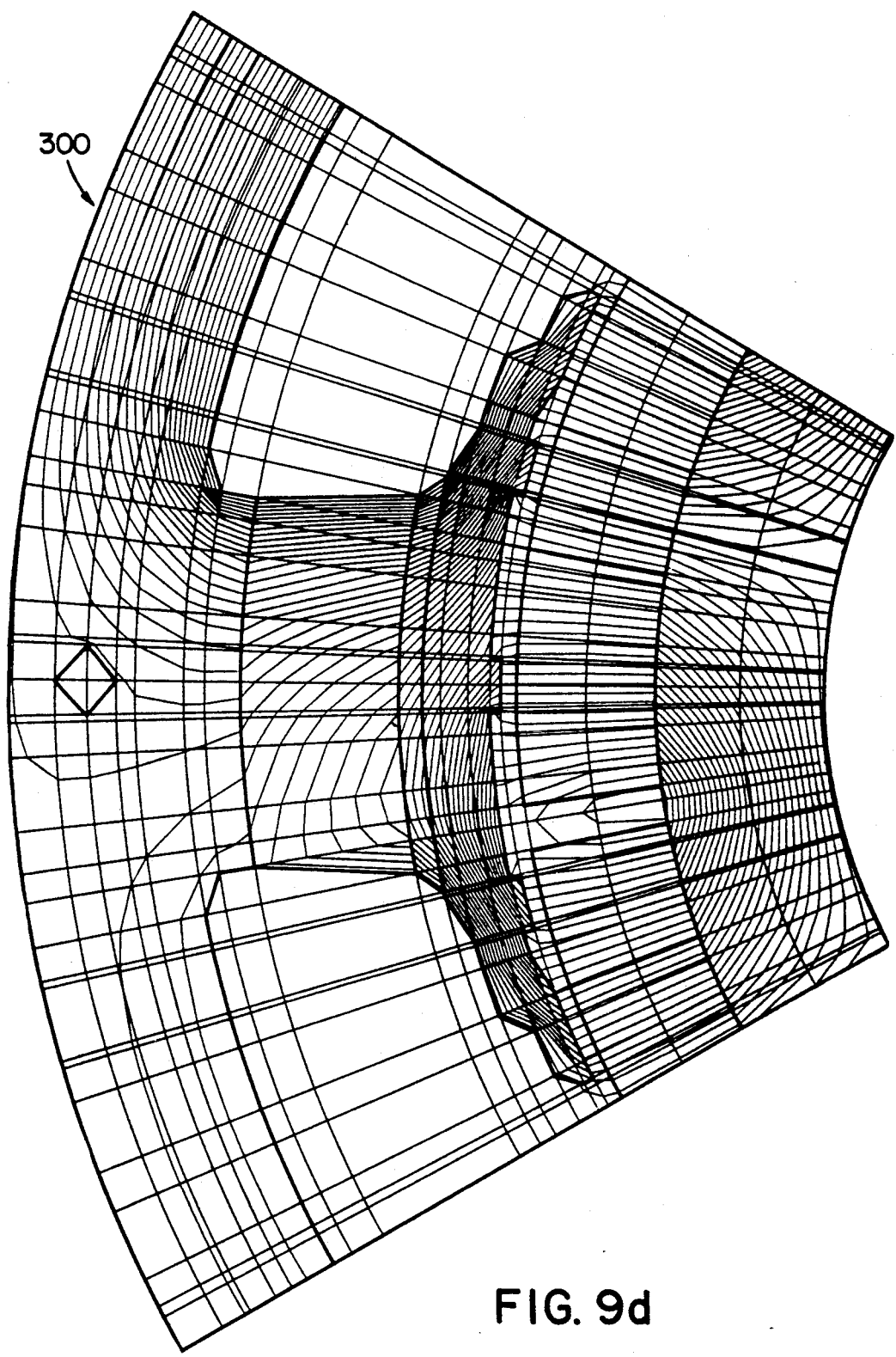

FIG. 9d shows a detail of an enlarged cutaway sector indicated as IXd in FIG. 9c. The field line pattern was also printed out by computer. Cutouts 304, 305 and 306 distributed uniformly on the outer perimeter of the stator yoke can be used for mounting in a motor casing, e.g., by having the parts of the motor casing fit in a form locking manner into these cutouts.

The six stator poles are each provided with a concentrated winding (not shown) where two diametrically opposed windings are excited simultaneously, e.g., by having the two windings connected in series.

I claim:

1. A brushless dc motor having a cylindrical type air gap, a slotted stator core and permanent magnet excitation, the air gap being defined between circumferentially facing faces of the slotted stator core and an opposing ring of permanent magnets formed to rotate with respect to the core, the core having a plurality of radially extending winding slots, and the motor including at least one winding forming electromagnetic poles defined in the sectors between slots of the stator core with a plurality of raised portions on each of the electromagnetic pole faces extending radially into the air gap, the circumferential width of the raised portions being small compared to the circumferential width of the pole pitch, the raised portions on each of the pole faces being located such that the distance measured in the direction of rotor rotation from the center of a stator slot defined between any given pair of stator poles to the center of one of said raised portions on the stator face adjacent said given pair of stator poles is equal to n times the rotor pole pitch, n being a whole number.

2. A motor according to claim 1, wherein the circumferential extent of the raised portion corresponds to from 0.5 to 1 times the circumferential width of the stator slot orifice.

3. A motor according to claim 2, wherein the air gap directly next to the raised portion as seen in the circumferential direction has the maximum dimension, which dimension decreases in the direction of the stator pole ends, preferably to a value equal to that above the cog.

4. A motor according to claim 3, wherein the height of the raised portion is from 0.1 to 0.3 mm with an effective air gap of from 0.3 to 0.6 mm.

5. A motor according to claim 3, wherein the reduction in air gap dimension is gradual and continuous.

6. A motor according to claim 5, wherein the air gap next to the raised portion soon decreases drastically in dimension, then increases again near the stator pole ends and finally decreases directly at the stator pole ends.

7. A motor according to claim 1, wherein the rotor is an internal rotor.

* * * * *

UNITED STATES PATENT AND TRADEMARK OFFICE
CERTIFICATE OF CORRECTION

PATENT NO. : 5,170,083
DATED : December 8, 1992
INVENTOR(S) : Martin Burgbacher

It is certified that error appears in the above-indentified patent and that said Letters Patent is hereby corrected as shown below:

Column 2, line 46, change "FIG." to read --FIGS.--.

Column 2, line 67, change "wherein" to read --uneven--.

Column 3, line 22, change "moment" to read --component--.

Column 3, line 64, after 's' insert a comma --,--.

Column 4, line 6, change "t" to read --this--.

Column 4, line 38, after the word "used" delete the comma ",".

Column 5, line 40, after the word "above" insert a comma --,--.

Column 5, line 55, after "Because" insert the word --of--.

Column 5, line 63, change "cogs-303" to read --cogs 303--.

Signed and Sealed this

Eleventh Day of January, 1994

Attest:

BRUCE LEHMAN

Attesting Officer     Commissioner of Patents and Trademarks